L. B. THWAITES 2,732,674

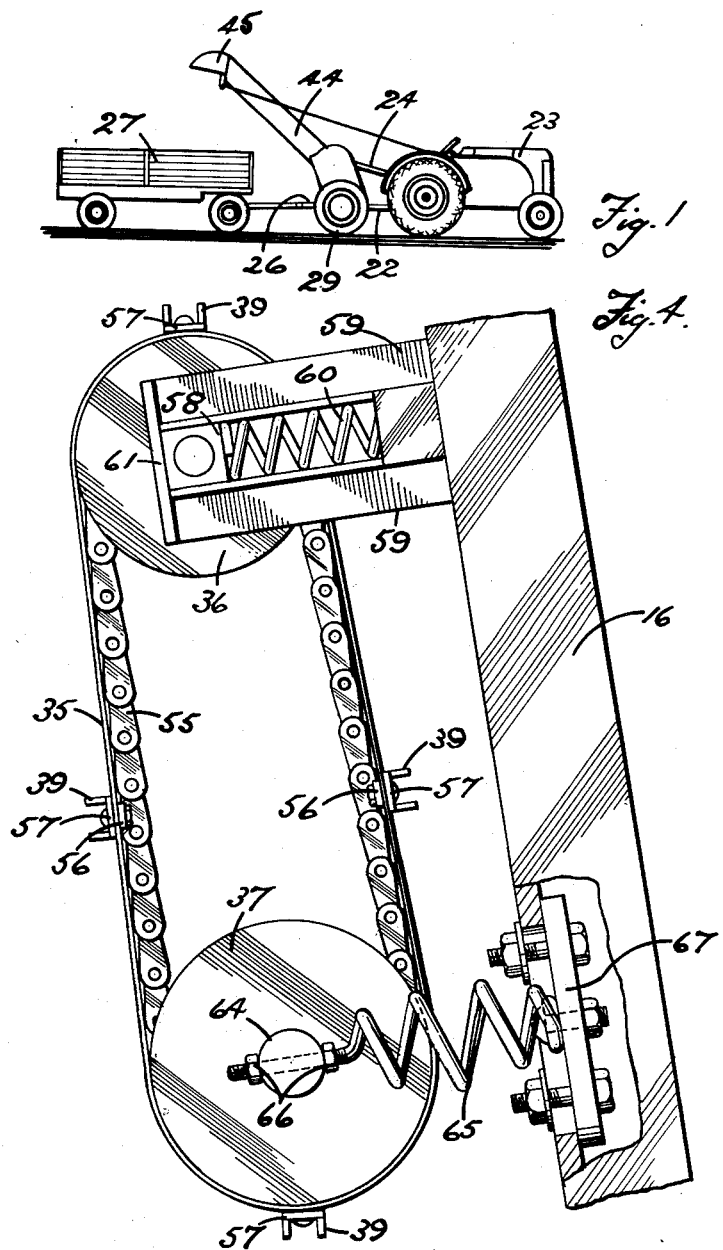
Jan. 31, 1956
L. B. THWAITES
2,732,674
MACHINE FOR PICKING UP CUT FODDER LYING
ON THE GROUND, CHOPPING IT AND
DELIVERING IT TO A TRAILER
Filed July 11, 1952
2 Sheets-Sheet 1
Inventor
Leslie Basil Thwaites
By Mawhinney & Mawhinney
Attorneys Jan. 31, 1956

MACHINE FOR PICKING UP CUT FODDER LYING
ON THE GROUND, CHOPPING IT AND
DELIVERING IT TO A TRAILER

Filed July 11, 1952

Inventor
Leslie Basil Thwaites

By Mawhinney & Mawhinney

Attorneys

United States Patent Office 2,732,674
Patented Jan. 31, 1956

2,732,674

MACHINE FOR PICKING UP CUT FODDER LYING ON THE GROUND, CHOPPING IT, AND DELIVERING IT TO A TRAILER

Leslie Basil Thwaites, Cubbington, near Leamington Spa, England

Application July 11, 1952, Serial No. 298,312

Claims priority, application Great Britain December 29, 1951

6 Claims. (Cl. 55—118)

This invention relates to a machine which includes a power-driven means for picking up cut fodder (for example, grass, lucerne or the stems of a cereal crop) lying on the ground and delivering it, directly or indirectly, to a power-driven rotary chopping device adapted to throw the chopped fodder into an attached trailer, when the two are appropriately drawn across the ground.

According to the invention, the frame of the machine (i. e., of the said pick-up means and chopping device) is adapted to be carried by a lift mechanism of a tractor, and, in addition, to provide a point for the direct attachment of the trailer, or to allow of the trailer being attached directly to the lift mechanism, thus at all times avoiding any loose link in the connection between the tractor and the trailer.

Thus, when the trailer has been filled the lift mechanism can be operated to raise the said machine and the tractor can then be driven to an unloading point for the trailer; and, due to the trailer being directly coupled, in effect, to the tractor, it can be backed or otherwise manoeuvred in a simple and satisfactory manner.

In the accompanying drawings:

Figure 1 is an elevation of a machine arranged according to invention, the machine being connected to be carried by the hydraulic lift mechanism of a tractor, and also connected to a trailer;

Figure 4 is an elevation on an enlarged scale and showing the endless conveyor supporting means of Figure 2.

Figure 2:
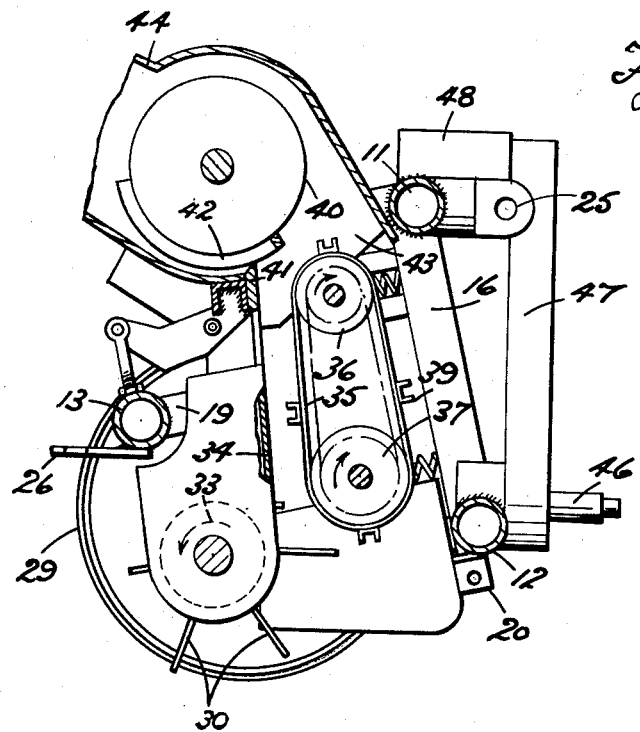
Figure 2 is a sectional elevation of the machine alone, taken on the line 2—2 of Figure 3 and to a larger scale.

The frame of the machine comprises upper and lower tubes 11, 12 at the front, and a rear tube 13, the front tubes being welded or otherwise secured at their ends to angle section or like frame members 15, 16 and 17, whilst these frame members are welded or otherwise secured to two other frame members 18, 19 as shown, the latter also being welded or otherwise secured to the ends of the rear tube 13. In addition, the lower tube 12 has secured thereon, and to the adjacent frame members 16, 17, brackets 20, 20 having coaxial holes for the reception of pins 21, 21 removably passed through the forked ends of the two lower links 22 of the usual form of the hydraulic lift mechanism of a tractor 23 (Figure 1), an attachment point for the upper link 24 of the lift mechanism being provided at 25. The rear tube 13 carries an attachment point 26 (Figure 2) for a trailer 27. This is shown in the present instance as a four-wheeled one.

The drawings show the hydraulic lift mechanism in the released position when ground wheels 29, for the machine, are engaging the ground, thus positioning the pick-up reel carrying the spikes 30 (Figure 2) at an appropriate height relatively to the ground. The pick-up reel is journalled in any convenient manner on the frame members 18 and driven in the direction of the arrow 33.

During their rotation the spikes are withdrawn into the interior of the slotted guiding sheet 34 along which the picked-up fodder is carried by an endless conveyor 35, passed over rollers 36, 37 which are driven in the directions shown.

The endless conveyor 35 is provided with rows of elevating teeth 39 by means of which the picked-up fodder, passing between the guiding sheet and the flexible belt, is shot onto a rotary, helical, chopping-up cutter, indicated at 40, which coacts with a stationary, adjustable, cutter or ledger plate 41.

As shown more clearly by Figure 4, the endless conveyor 35, which may be, for example, of canvas, is mounted on endless chains 55 passed around the rollers 36, 37, the chains having brackets 56 to which are bolted transverse U-shaped bars 57 having their edges serrated to farm the teeth 39. The roller 36 is journalled at each end in a bearing block 58 which is slidably mounted in guides 59 secured to the frame member 16, and the block is pressed by a spring 60 against a plate 61 which ties together the ends of the guides. The lower roller 37 is journalled on a shaft 64 which is secured at each end to the members 16 by means of a saddle spring 65 one end of which passes through the shaft 64 and is secured thereto by bolts 66 and the other end of which is secured to a plate 67 adjustably mounted on the member 16.

It will thus be seen that the endless conveyor 35 is resiliently biassed towards the guiding sheet 34, and can be tensioned by adjustment of the plate 67.

The chopped fodder is then delivered along a shoot 44 of inverted U-section, terminating with a controllable baffle 45 by means of which the fodder may be delivered to different parts of the trailer 27.

Futhermore, with the present construction it has been found to be desirable that the casing (which is formed by the end of the shoot 44) round the front of the rotary cutter 41 should be open at 43 so as to allow air to enter, particularly in the case in which the rotary chopping device is one having but a single helical blade 42 along its length, covering, approximately 180° of the circumference. With such a rotary chopping device, the opening 43 at the front, just alongside the return-run of the endless conveyor 35, enables the cutter to shoot the chopped material a greater distance.

Figure 3:
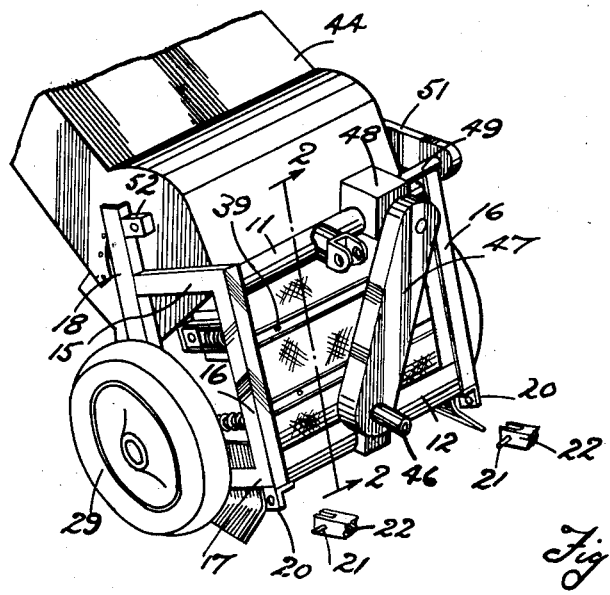
Figure 3 is a perspective view thereof.

In the present instance, the power take-off shaft of the tractor is coupled to a shaft 46 which drives through an endless chain in the casing 47 and rightangled gearing in a box 48, a shaft 49 (Figure 3). This shaft has a chain wheel connected by an endless chain (not shown), within a casing 51 (Figure 3), to the shaft of the rotary cutter 41—which, incidentally, is journalled at 52 on the upper portions of the frame members 18. In this way the cutter is driven at a very high speed, and is well able to throw the chopped fodder the whole length of the shoot 44. Chain drives are also provided for the pick-up reel and the rollers 36, 37.

Thus, when the machine and trailer 27 have been appropriately drawn across the ground until the trailer is substantially filled, the driver of the tractor 23 merely has to operate the lift mechanism in the raising direction to clear the pick-up means and its associated frame from the ground, and the trailer can then be driven forthwith to the farmstead or other desired delivery point for unloading, when it can be manoeuvred by the tractor into a requisite position in a simple manner. So soon as it has been discharged the machine and trailer can be taken back to the field or elsewhere for a further picking-up, chopping and collecting operation.

What I claim as my invention and desire to secure by Letters Patent of the United States is:

1. In combination a tractor, a machine, a trailer, means detachably mounting the machine between the tractor and the trailer on the rear of and entirely behind the tractor for movement relative to the tractor in a vertical direction only so that the machine is easily removable from the tractor, ground engaging wheels on said machine to permit manual maneuvering of the machine when the machine is detached from the tractor, said detachable mounting means comprising a lifting mechanism on the tractor for lowering said ground wheels into engagement with the ground and for raising said ground wheels clear of the ground so as to place the machine in a position to facilitate maneuvering the tractor, and means for pivotally hitching the trailer from the machine, said machine comprising means for gathering material and means for delivering the gathered material to the trailer.

2. In combination a tractor, a machine, a trailer, a lifting mechanism on said tractor, cooperating means on said lifting mechanism and on said machine for detachably connecting said machine to said lifting mechanism for restraining the tractor and the machine against relative lateral movement regardless of whether the lift mechanism is in its raised or lowered position and for permitting easy removal of the machine from the tractor, means for articulating said trailer to said machine to permit steering of the trailer with respect to the tractor and the machine, said machine comprising means for gathering material and means for delivering the gathered material to the trailer, said machine being located entirely behind the tractor and between the tractor and the trailer, and ground engaging wheels on said machine to permit manual maneuvering of the machine when the machine is detached from the tractor, said lifting mechanism adapted to lower the ground wheels into ground engaging position and to raise said wheels clear of the ground so as to place the machine in a position to facilitate maneuvering the tractor.

3. In combination a tractor, a machine, a trailer, a lifting mechanism on said tractor, cooperating means on said lifting mechanism and on said machine for detachably connecting said machine to said lifting mechanism for restraining the tractor and the machine against relative lateral movement regardless of whether the lift mechanism is in its raised or lowered position and for permitting easy removal of the machine from the tractor, means for articulating said trailer to said machine to permit steering of the trailer with respect to the tractor and the machine, said machine comprising means for gathering material and means for delivering the gathered material to the trailer, said gathering and delivering means being directed generally upwardly, said machine being located entirely behind the tractor and between the tractor and the trailer, and ground engaging wheels on said machine to permit manual maneuvering of the machine when the machine is detached from the tractor, said lifting mechanism adapted to lower the ground wheels into ground engaging position and to raise said wheels clear of the ground so as to place the machine in a position to facilitate maneuvering the tractor.

4. In combination a tractor, a machine, a trailer, a lifting mechanism on said tractor, cooperating means on said lifting mechanism and on said machine for detachably connecting said machine to said lifting mechanism for restraining the tractor and the machine against relative lateral movement regardless of whether the lift mechanism is in its raised or lowered position and for permitting easy removal of the machine from the tractor, means for articulating said trailer to said machine to permit steering of the trailer with respect to the tractor and the machine, said machine comprising means for chopping material, means operatively associated with said chopping means for gathering material and conveying it to said chopping means, and means operatively associated with said chopping means for delivering the chopped material selectively to different areas of the trailer, said machine being located entirely behind the tractor and between the tractor and the trailer, and ground engaging wheels on said machine to permit manual maneuvering of the machine when the machine is detached from the tractor, said lifting mechanism adapted to lower the ground wheels into ground engaging position and to raise said wheels clear of the ground so as to place the machine in a position to facilitate maneuvering the tractor.

5. For use with a tractor having a lift mechanism and a power take-off shaft and a trailer adapted to be drawn along by the tractor, a machine, means on said machine adapted to couple detachably the machine directly to the lift mechanism of the tractor regardless of whether the lift mechanism is in its raised or lowered position for permitting easy removal of the machine from the tractor, said machine adapted to be located entirely behind the tractor and between the tractor and the trailer when the machine is coupled to the tractor and the trailer and comprising means adapted to be driven by the power take-off shaft of the tractor for chopping fodder, power driven means operatively associated with said chopping means for picking up fodder lying on the ground and delivering it to said chopping means, means operatively associated with said chopping means for conducting the chopped fodder from said chopping means and adapted to deliver it to the trailer, and ground engaging wheels on said machine to permit manual maneuvering of the machine when the machine is uncoupled from the tractor, said wheels adapted to be lowered into ground engaging position and to be raised clear of the ground by the lift mechanism so as to place the machine in a position to facilitate maneuvering the tractor.

6. In combination three separable units detachably coupled together so as to be easily separated comprising a tractor, a trailer and a machine disposed between the tractor and the trailer and located entirely behind the tractor, ground engaging wheels on said machine for permitting manual maneuvering of the machine when the machine is uncoupled from the tractor, and means detachably coupling the machine to the tractor comprising a lifting mechanism on the tractor for lowering and raising the machine to bring the ground wheels into and out of engagement with the ground so as to put the machine into a position to facilitate maneuvering the tractor, said detachable coupling means restraining the tractor and machine against relative lateral movement regardless of whether the machine is in its raised or lowered position, said machine comprising means for gathering material and means for delivering the gathered material to the trailer.

References Cited in the file of this patent

UNITED STATES PATENTS

| | | |
|---|---|---|
| 2,325,833 | Cook | Aug. 3, 1943 |
| 2,343,153 | Miller | Feb. 29, 1944 |
| 2,413,807 | Warne | Jan. 7, 1947 |
| 2,439,259 | McCormack | Apr. 6, 1948 |
| 2,526,396 | Nowlin | Oct. 17, 1950 |
| 2,562,659 | Carter et al. | July 31, 1951 |
| 2,585,891 | Worsdell | Feb. 12, 1952 |
| 2,608,310 | De Penning | Aug. 26, 1952 |
| 2,624,997 | Orendorff | Jan. 13, 1953 |